US011281759B2

(12) United States Patent
Gascuel

(10) Patent No.: US 11,281,759 B2
(45) Date of Patent: Mar. 22, 2022

(54) SEGMENTED KEY AUTHENTICATION SYSTEM

(71) Applicant: Jacques Gascuel, Escaldes-Engordany (AD)

(72) Inventor: Jacques Gascuel, Escaldes-Engordany (AD)

(*) Notice: Subject to any disclaimer, the term of this patent is extended or adjusted under 35 U.S.C. 154(b) by 134 days.

(21) Appl. No.: 16/488,041

(22) PCT Filed: Feb. 26, 2018

(86) PCT No.: PCT/FR2018/050450
§ 371 (c)(1),
(2) Date: Aug. 22, 2019

(87) PCT Pub. No.: WO2018/154258
PCT Pub. Date: Aug. 30, 2018

(65) Prior Publication Data
US 2021/0136579 A1 May 6, 2021

(30) Foreign Application Priority Data

Feb. 27, 2017 (FR) ...................................... 1751535

(51) Int. Cl.
*G06F 21/35* (2013.01)
*H04W 12/06* (2021.01)
*H04L 9/08* (2006.01)

(52) U.S. Cl.
CPC .............. *G06F 21/35* (2013.01); *H04L 9/085* (2013.01); *H04W 12/068* (2021.01)

(58) Field of Classification Search
CPC ....... H04W 12/068; G06F 21/35; H04L 9/085
See application file for complete search history.

(56) References Cited

U.S. PATENT DOCUMENTS

2002/0132605 A1* 9/2002 Smeets ................... H04L 63/18
455/411
2011/0093712 A1* 4/2011 Jin ......................... H04L 9/0838
713/171
(Continued)

FOREIGN PATENT DOCUMENTS

EP 1 213 882 A2 6/2002

OTHER PUBLICATIONS

International Search Report dated May 22, 2018, issued in corresponding International Application No. PCT/FR2018/050450, filed Feb. 26, 2018, 5 pages.
(Continued)

*Primary Examiner* — Nelson S. Giddins
(74) *Attorney, Agent, or Firm* — Christensen O'Connor Johnson Kindness PLLC

(57) ABSTRACT

An authentication system to authenticate at least one application accessible by a user via a computer for which access is controlled by an authentication datum includes a main mobile device and a main token in which the authentication datum is recorded. The main mobile device is configured to recover the authentication datum of the main token using a pairing key that is segmented into a plurality of segments. A first segment is recorded on the main mobile device and at least one additional segment is recorded on a secondary mobile device and/or a secondary token. The main mobile device is configured to recover the additional segment or segments in order to reconstitute the pairing key and to present the reconstituted pairing key to the main token.

11 Claims, 2 Drawing Sheets

(56) References Cited

U.S. PATENT DOCUMENTS

Figure 1:
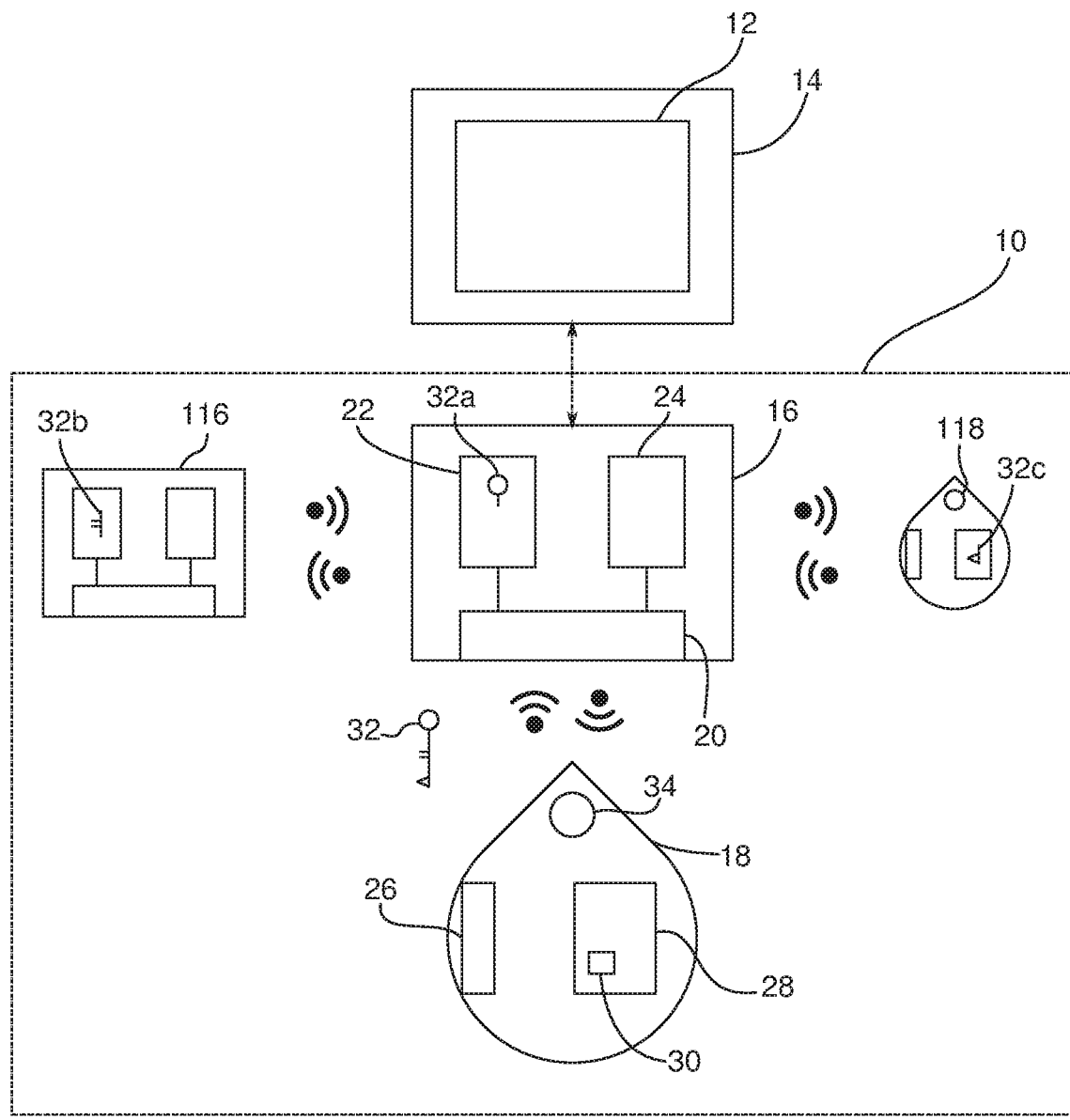

| | | | | |
|---|---|---|---|---|
| 2011/0313922 A1* | 12/2011 | Ben Ayed | ............... | G06Q 20/32 |
| | | | | 705/42 |
| 2014/0208112 A1* | 7/2014 | McDonald | ............... | G06F 21/41 |
| | | | | 713/171 |
| 2016/0286396 A1* | 9/2016 | Tuukkanen | ......... | H04W 12/069 |
| 2016/0337863 A1* | 11/2016 | Robinson | .............. | H04W 4/021 |

OTHER PUBLICATIONS

Written Opinion dated May 22, 2018, issued in corresponding International Application No. PCT/FR2018/050450, filed Feb. 26, 2018, 6 pages.

* cited by examiner

SEGMENTED KEY AUTHENTICATION SYSTEM

1. TECHNICAL FIELD OF THE INVENTION

The invention concerns an authentication system to authenticate to one or more applications. In particular, the invention concerns an authentication system to one or more applications accessible via a computer and for which the access is controlled by an authentication data, which may be for example a digital identity, an identifier/password pair, an encryption key, an access code, an association key of two devices, etc.

2. BACKGROUND

Current authentication systems are generally based on weak authentication such as identifier and/or password. This type of authentication is one of the easiest to set up and requires the intervention of a user who will enter these identifiers that he knows or that are noted on another document.

This type of authentication has several disadvantages.

First, it is based on the user's memory and if the user must remember a plurality of identifiers and/or passwords, he is likely to easily forget the identifier/password pairs associated with each application. To solve this disadvantage, there are password managers, for which the access is protected by a main password. However, if a person recovers the main password, he has access to all the user's identifier/password pairs, which is very damaging.

Second, if a malicious person steals the identifier/password pair remotely by hacking or because it is written on a document, that malicious person can access the application without the user being aware of the theft. To solve this disadvantage, there are physical objects or devices owned by the user that can provide the authentication data, for example a smart card, USB key, mobile device, etc., via a card reader for example. However, if a malicious person recovers this object or device, they can easily access the application instead of the user or at least recover the data it contains.

Another solution was to opt for a so-called strong identification, in which a password is requested, and a code is sent by SMS to a user's phone to verify his identity. In this case, the disadvantage is that if the phone is stolen, this SMS is received directly by the malicious person and simplifies its authentication with the application.

Finally, even if the identifier/password pair is sufficiently hidden from a malicious person, it must be entered in clear in the application. Thus, it can be recovered by a malicious person, especially if the latter has installed a keylogger on the computer used by the user to access the application.

The inventor therefore sought a solution to these disadvantages.

3. OBJECTIVES OF THE INVENTION

The invention aims to overcome at least some of the disadvantages of known authentication systems.

In particular, the invention aims to provide, in at least one embodiment of the invention, an authentication system that allows the secure storage of one or a plurality of authentication data.

The invention also aims to provide, in at least one embodiment, an authentication system using physical objects for authentication in order to avoid remote theft of authentication data.

The invention also aims to provide, in at least one embodiment of the invention, an authentication system allowing to avoid password theft by a keylogger.

The invention also aims to provide, in at least one embodiment of the invention, an authentication system to protect against the risks of authentication by a malicious person in the event of theft of one or more of the equipment of this authentication system.

4. DISCLOSURE OF THE INVENTION

At this end, the invention concerns an authentication system to at least one application accessible by a user via a computer and for which the access is controlled by an authentication data, comprising:
- a main mobile device, comprising a near-field communication module, a non-volatile memory and a volatile memory, and configured to communicate with the computer,
- a main token, comprising a near-field communication module and a non-volatile memory in which at least one authentication data is recorded,
- the main mobile device being configured to recover, via the near-field communication module, the authentication data of the main token using a pairing key, and the main token being configured to allow access to the authentication data only upon presentation of said pairing key,
- characterized in that the pairing key is segmented into a plurality of segments, a first segment being recorded on the non-volatile memory of the main mobile device and at least one other additional segment being recorded on a non-volatile memory of a secondary mobile device and/or a non-volatile memory of a secondary token, the main mobile device being configured to recover the additional segment(s) by near-field communication with said secondary mobile device(s) and/or said secondary token(s), to reconstitute the pairing key and to present the reconstituted pairing key to the main token.

An authentication system according to the invention therefore allows storing authentication data in a physical token called main token, which thus acts as an authentication manager, but for which the access is dependent on a segmented pairing key for which the segments are distributed among a plurality of physical devices, which may be other tokens and/or mobile devices. These physical devices can be hidden or worn by different people. Instead of using the user's memory to remember a password, the user retains which devices contain the segments of the pairing key and keeps this information secret. Thus, a malicious person who wants to access the authentication data included in the main token will not be able to do so until he or she has fully reconstructed the pairing key with all segments. But these key segments can be hidden, for example a user in an office of a company can recover a key segment in a token hidden under the desk, and/or in a token hidden at the entrance of his office and/or in another room of the company, and/or ask a line manager for a segment registered in his mobile device that can authenticate it visually, etc. The interactions of the main mobile device with the main token and all segment recoveries are done by near-field communication, which requires physical proximity and avoids remote hacking. There is no connection to an Internet network that would increase the risk of remote piracy. All communications are done over a local area network, including the connection between the computer and the main mobile device (which can be connected by cable or wireless, for example by Wi-Fi or Bluetooth).

The mobile device is for example a smartphone, a tablet, etc. The token is a physical object such as for example a NFC (Near Field Communication) tag, powered only via near field or with a clean power source (a battery pack or battery for example). The application can be a web page, a software, an application software, etc. The computer can be any equipment including a processor such as a smartphone, a fixed/mobile personal computer, a tablet, a smart object, etc.

The first segment held by the main mobile device can be held permanently by this main mobile device, or it can be received in advance, for example sent by an external server.

The authentication data can be for example a digital identity, an identifier/password pair, an encryption key, an access code, an association key for two devices (such as Wi-Fi or Bluetooth association), etc. The authentication data can be associated with a label (a name or a reference for example), allowing it to be found in the main token. The main token is like a password manager but more complete because it allows more authentication types, and to a physical object as described in the prior art but with an additional security layer. Indeed, it does not have the disadvantages described above, in particular:

there is no main password to access all authentication data if it is stolen. All data is secured by key segments that offer much more robust protection, in particular because they are not available remotely;

a theft of the main token does not allow access to the authentication data because access to this data stored in the memory is subject to the presentation of the pairing key. Without the pairing key, the main token is useless. In addition, the data it contains is encrypted (e.g. AES 256 encryption) and the token may include internal protections to prevent data theft, such as data deletion (in particular followed by random data rewriting) or physical destruction, in particular after one or more attempts to present a pairing key. Moreover, even if future technological developments allows breaking the encryption key used for the data, this data is in any case inaccessible without the full pairing key. Similarly, the decryption of a key segment does not allow the key to be found in the absence of other segments that may be in physically hidden objects;

a theft of the mobile device also does not allow access to the application, nor to recover the authentication data of the main token, since it is necessary to be in possession of all the key segments and therefore to know the existence, identity and location of the secondary mobile device(s) and/or the secondary token(s).

In addition, the main mobile device can be paired in advance with the main token, so that the pairing key can only be provided by this main mobile device, in which case it is rejected. This prior pairing enhances security in the very unlikely event that a malicious person managed to reconstruct the key with all segments.

The authentication system is described in terms of access to a single application, whose authentication data is included in a token, which is therefore the main token since it contains this data. However, the main token for one application can be a secondary token for another application, i.e. it can include a pairing key segment for another main token for another application. Similarly, a secondary token for the application described in the invention may include authentication data for another application. Similarly, the main mobile device may include another key segment, or a secondary device may communicate with a computer for another application.

According to some variants of the invention, the main token (or a secondary token) may include a microcontroller. The microcontroller can improve the security of the system, by controlling certain security mechanisms internally, in particular an encryption in AES256/SHA256 and/or RSA2048 and/or RSA4096. The microcontroller allows application management of certain functions that are supported by the main mobile device when the token does not include this microcontroller. In particular, some security mechanisms are improved by allowing the internal manipulation of the memory, the count of the number of pairing attempt, the authentication management, the time management by a real time clock, the management of sensors, etc.

According to some variants of the invention, the main token is configured so that it is accessible via two profiles of different peoples:

an administrator profile, which can configure the main token, in particular the type of scrambling, the number of attempts allowed, the protection mechanisms, the user passwords, the segmentation of the pairing key, the main mobile device that can be used, the privilege of data access by users, etc. In addition, the administrator can consult all the authentication data labels on the token;

at least one user profile, which must submit to the constraints predefined by the administrator, and only check the presence of the label of the authentication data it wishes to recover without being able to consult all the labels.

The passwords of the administrator and the user(s) are encrypted and stored in the token.

Advantageously and according to the invention, the additional segment(s) recovered by the main mobile device are stored on the volatile memory of the main mobile device.

According to this aspect of the invention, the mobile device does not permanently keep the authentication data in order to prevent it from being copied by a malicious person. The volatile memory is for example a memory of RAM (Random Access Memory) type.

In a preferential operation of the invention, the authentication data is present on the volatile memory only a fraction of a second (in the order of a millisecond), only the time to transfer this data to the computer, then is deleted (or released to be replaced by another type of data). Preferably, the computer itself stores the authentication data on a volatile memory.

Since the authentication data is stored in a volatile memory for a very short time, it is difficult or even impossible to recover it for a malicious person. In addition, it is usually small data (a few bytes), so a malicious person who would analyse the memory would have to find this small data among several megabytes, gigabytes or terabytes of data.

Advantageously and according to the invention, the digital data is a password, in that the main token comprises a scrambling module adapted to scramble said password by adding characters to particular positions of the password, said characters and positions being predetermined and known to the user.

According to this aspect of the invention, the scrambling allows combating keyloggers by adding characters at predetermined positions known to the user by mnemonic means. These added characters are then deleted by the user in the text field for the password. Thus, when the user will copy the password into the field, the password displayed will be a scrambled password, which can be recovered by a keylogger or even read directly on the screen by a malicious person. When the user deletes the added characters using a keyboard, a keylogger will only detect a press on a delete key, without knowing where the cursor is located and therefore without knowing which character has been deleted.

In other variants of the invention, for example when the authentication data is not a password to be entered, the scrambling is not necessary because a keylogger cannot detect anything and authentication is done automatically upon presentation of the authentication data, without user intervention.

Advantageously and according to the invention, the pairing key is segmented into a first segment and at least two additional segments, and in that the additional segments are ordered, so that the reconstitution of the pairing key is only possible if the additional segments are recovered by the main mobile device in a predetermined order.

According to this aspect of the invention, the reconstitution of the pairing key is subject both to the knowledge of the position and identity of the secondary equipment including the additional segments, which already provides a first security as explained above, but also to the order in which these segments are recovered. For example, the user must first recover additional segment no 1 of a secondary token near the entrance to his office, an additional segment no 2 of a secondary token under his desk, and an additional segment no 3 of a secondary mobile device carried by his manager. If the additional segments are not recovered in the order (e.g., no 3 then no 1 then no 2), the reconstituted key with the segments in an unordered manner does not form the pairing key and the main mobile device cannot recover the authentication data. If the segments are recovered in order, the pairing key is reconstituted.

Advantageously and according to the invention, the main token comprises a plurality of authentication data each identified by a label, and in that the main mobile device requires an authentication data by providing said label to the main token.

According to this aspect of the invention, the same main token may contain authentication data for a plurality of applications and the labels allow finding an authentication data in the main token. The labels can also allow the main mobile device to check in advance that the data is in the main token and not in another token.

The invention also concerns a method implemented by an authentication system according to the invention, characterized in that it comprises the following steps:
  a step of requesting an authentication data by the application,
  a step of transmitting the request from the computer to the main mobile device,
  a step of communication in near-field of the main mobile device with the main token,
  a step of checking the reconstituted pairing key presented by the device, and:
    as long as the pairing key is not complete, a step of recovering at least one pairing key segment by the main mobile device, followed by a new step of checking the reconstituted pairing key,
    if the pairing key is correct, a step of transmitting the authentication data by the main token to the main mobile device,
  a step of storing the authentication data by the main mobile device in its volatile memory,
  a step of transmitting the authentication data by the main mobile device to the computer,
  a step of authentication to the application via the authentication data.

A method according to the invention thus allows a total control of the authentication of a user wishing to access an application on the computer. The authentication data, stored on the main token, is only provided in the presence of all segments of the pairing key. The segments of the pairing key may be recovered in advance by the main mobile device and then provided to the main token, or the main mobile device may attempt to access the main token, in which case the main token refuses access and indicates that the key presented is not complete.

Preferably, the number of verification steps can be limited (from one to a plurality of steps), and if this number is exceeded, the main token initiates a data protection step for the data it contains, for example by deleting the data and rewriting it to prevent access by a malicious person. This number of verification steps is pre-configurable in the main token, and a malicious person cannot know how many verification steps are allowed and therefore cannot predict a multiple attack based on the number of possible attempts (there may only be one).

Advantageously and according to the invention, in the variant of the authentication system in which the main token includes a scrambling module, the step of authentication to the application includes a sub-step of copying the scrambled password into a text field of the application, and a sub-step of deleting by the user the characters added by the scrambling module, so that the displayed password matches the password of the application.

In another variant of the invention, the user can also add characters to restore the password.

The invention also concerns an authentication system and an authentication method characterized in combination by all or some of the characteristics mentioned above or below.

5. LIST OF FIGURES

Figure 2:
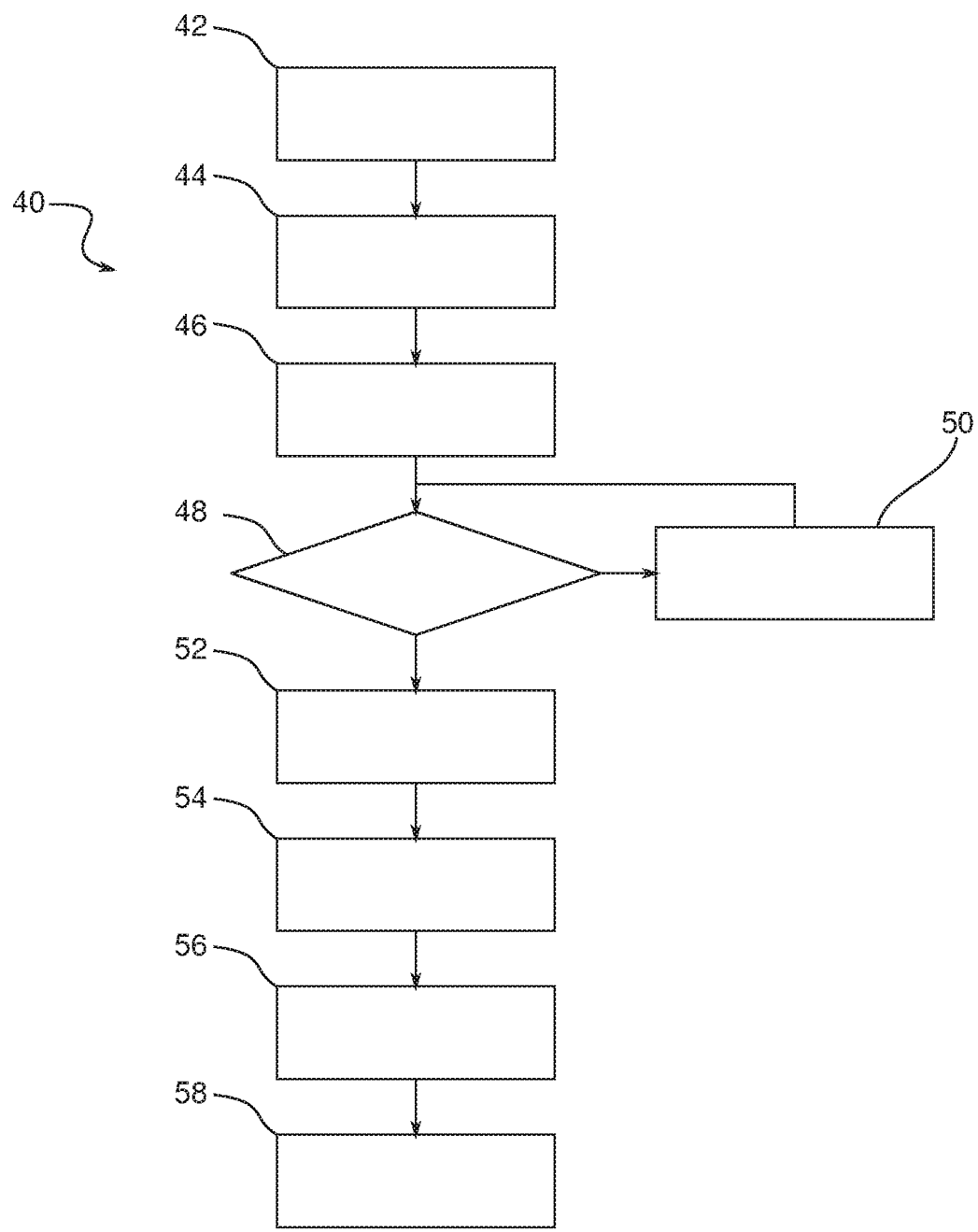

Other purposes, characteristics and advantages of the invention will appear when reading the following description, which is given in a non-limiting way only and refers to the annexed figures in which:

FIG. 1 is a schematic view of an authentication system according to an embodiment of the invention, FIG. 2 is a schematic view of an authentication method according to an embodiment of the invention.

6. DETAILED DESCRIPTION OF AN EMBODIMENT OF THE INVENTION

The following embodiments are examples. Although the description refers to one or more embodiments, this does not mean that each reference refers to the same embodiment, or that the characteristics apply only to one embodiment. Simple characteristics of different embodiments can also be combined to provide other embodiments. On the figures, scales and proportions are not strictly respected for illustration and clarity purposes.

FIG. 1 schematically represents a system 10 of authentication according to an embodiment of the invention. The authentication system 10 allows controlling the access to an application 12 accessible via a computer 14. The authentication system consists of a main mobile device 16 and a main token 18. The main mobile device includes a near-field communication module 20, a non-volatile memory 22 and a volatile memory 24.

The main token 18 also includes a near-field communication module 26 and a non-volatile memory 28, in which at least one authentication data 30 is stored (in an encrypted way). The main token can include a clip 34 to be carried as key rings.

To access the application, a user needs this authentication data 30. To recover it, the main mobile device 16 must have a pairing key 32 allowing access to the authentication data 30, said authentication data 30 being transmitted by the main token 18 only in the presence of this pairing key 32. This pairing key is preferably a key of the encryption key type and is a data composed of a sequence of hexadecimal values. However, the pairing key 32 is stored in several segments, a first segment 32a of which is stored in the non-volatile memory 22 of the main mobile device 16. One or more additional segments, here two additional segments are stored by other equipment: for example, a secondary mobile device 116, similar to the main mobile device 16, has an additional segment 32b and a secondary token 118, similar to the main token 18, has an additional segment 32c. To reconstitute the pairing key 32, the mobile device 16 must recover these additional segments through a near-field communication. The reconstitution of the pairing key 32 may require that the segments be recovered in a specific order.

The authentication method 40 implemented by this authentication system 10 is represented schematically in reference with FIG. 2.

The authentication method 40 includes a step 42 of requesting an authentication data by the application, a step 44 of transmitting the request from the computer to the main mobile device and a step 46 of a near-field communication of the main mobile device with the main token.

Before providing the authentication data, the main token performs a step 48 of verifying of the reconstituted pairing key presented by the device. As long as it is not complete, the main mobile device performs at least one step 50 of recovering at least one pairing key segment by the main mobile device, then the main token performs a new step of checking the reconstituted pairing key.

The number of verification steps 48 performed may be limited.

If the pairing key is complete, the main token performs a step 52 of transmitting the authentication data by the main token to the main mobile device.

The device then proceeds to a step 54 of storing the authentication data by the main mobile device in its volatile memory.

The method then includes a step 56 of transmitting the authentication data from the main mobile device to the computer.

Finally, the method includes a step 58 of authentication to the application via the authentication data.

The main token can also include a scrambling module (not shown), and the authentication step then includes a sub-step of copying the scrambled password into a text field of the application, and a sub-step of deletion by the user of the characters added by the scrambling module, so that the displayed password matches the password of the application. An example of scrambling of the password can be as follows:

The password for the application is motdepasse. When this password is required by the main mobile device, following presentation of the complete and valid pairing key, this password is scrambled by the scrambling module. It can also be stored directly scrambled and encrypted. The scrambled password is for example &mo@tdep%as^se. The user, knowing the predetermined scrambling, including the position of the scrambling, knows that the characters added are the $1^{st}$, $4^{th}$, $9^{th}$ and $12^{th}$ characters. He can enter into the scrambled password in the application, either by copying or by copy and paste. He then deletes the added characters by positioning himself before or after the added characters with a mouse or by touch and deletes them via a "delete" key (for example "Delete" or "Backspace" from the keyboard to allow the real password to be returned to the application.

A keylogger that would be installed on the computer running the application would therefore record the following keystrokes: "&" "m" "o" "@" "t" "d" "e" "p" "%" "a" "s" "^" "s" "e" "Delete button" "Delete button" "Delete button" "Delete button". It is therefore not able to read the password. The advantage is the same if a malicious person reads the scrambled password before it is corrected by the user: the malicious person thinks they have the right password, but it is wrong.

This password and this scrambling are of course presented for illustrative purposes, the chosen password and scrambling being obviously more complex, in particular the password is usually not composed of a dictionary word, is longer, and the scrambling should be more difficult to guess because for example mixed with complex characters of the password and the added characters are in large number.

The invention is not limited to the embodiments described. In particular, in addition to the security systems described here, the memories of the system elements and communications between the different system elements are preferably encrypted and protected by known security principles, in particular AES encryption, SSL encryption, etc., so as to add maximum security to each element and for each data transmission.

The invention claimed is:

1. An authentication system to at least one application accessible by a user via a computer and for which access is controlled by an authentication data, comprising:
a main mobile device, comprising a near-field communication module, a non-volatile memory and a volatile memory, and configured to communicate with the computer; and
a main token, comprising a near-field communication module and a non-volatile memory in which at least one authentication data is recorded,
the main mobile device being configured to recover, via the near-field communication module, the authentication data of the main token using a pairing key, and the main token being configured to allow access to the authentication data only upon presentation of said pairing key,
wherein the pairing key is segmented into a plurality of segments, a first segment being recorded on the non-volatile memory of the main mobile device and at least one additional segment being recorded on at least one of a non-volatile memory of a secondary mobile device or a non-volatile memory of a secondary token, the main mobile device being configured to recover the at least one additional segment by near-field communication with at least one of said secondary mobile device or said secondary token, to store said at least one additional segment on its volatile memory, to reconstitute the pairing key and to present a reconstituted pairing key to the main token.

2. The authentication system according to claim 1, wherein the authentication data is a digital identity, a password, an identifier/password pair, an encryption key or an access code.

3. The authentication system according to claim 2, wherein the digital identity is a password, in that the main token comprises a scrambling module configured to prepare a scrambled password by adding a plurality of characters to a plurality of particular positions of the password, said plurality of characters and plurality of positions being predetermined and known to the user.

4. The authentication system according to claim 1, wherein the pairing key is segmented into a first segment and at least two additional segments, and in that the at least two additional segments are ordered, so that reconstitution of the pairing key is only possible if the at least two additional segments are recovered by the main mobile device in a predetermined order.

5. The authentication system according to claim 1, wherein the main token comprises a plurality of authentication data each identified by a label, wherein the main mobile device requires an authentication data by providing said label to the main token.

6. The authentication system according to claim 5, wherein the main token is configured so that it is accessible via an administrator profile which can configure the main token, and a user profile which can only check a presence of the label of the authentication data.

7. An authentication method implemented by an authentication system according to claim 1, the authentication method comprising:
    preparing a request for an authentication data by the application;
    transmitting the request from the computer to the main mobile device;
    communicating in near-field between the main mobile device and the main token;
    checking the reconstituted pairing key presented by the main mobile device, and:
        as long as the pairing key is not complete, recovering at least one pairing key segment by the main mobile device, and then checking the reconstituted pairing key,
        once the pairing key is correct, transmitting the authentication data by the main token to the main mobile device;
    storing the authentication data by the main mobile device in its volatile memory;
    transmitting the authentication data from the main mobile device to the computer; and
    authenticating the application via the authentication data.

8. The authentication method of claim 7, wherein authenticating the application includes copying a scrambled password into a text field of the application, and deleting by the user the characters added by a scrambling module, so that a displayed password matches the password of the application.

9. The authentication system according to claim 1, wherein, once the authentication data has been recovered by the main mobile device, the volatile memory of said main mobile device is deleted or released to be replaced by another type of data after a time in the order of the millisecond.

10. An authentication system to at least one application accessible by a user via a computer and for which access is controlled by an authentication data, the authentication system comprising:
    a main mobile device, comprising a near-field communication module, a non-volatile memory, and a volatile memory, and being configured to communicate with the computer; and
    a main token, comprising a near-field communication module and a non-volatile memory in which at least one authentication data is recorded,
    the main mobile device being configured to recover, via the near-field communication module, the authentication data of the main token using a pairing key, and the main token being configured to allow access to the authentication data only upon presentation of said pairing key,
    wherein the pairing key is segmented into a plurality of segments, a first segment being recorded on the non-volatile memory of the main mobile device and at least one additional segment being recorded on at least one of a non-volatile memory of a secondary mobile device or a non-volatile memory of a secondary token, the main mobile device being configured to recover the at least one additional segment by near-field communication with at least one of said secondary mobile device or said secondary token, to store said at least one additional segment on its volatile memory, to reconstitute the pairing key, and to present a reconstituted pairing key to the main token,
    and wherein the authentication system further comprises a scrambling module configured to copy a scrambled password into a text field of the application.

11. An authentication method implemented by an authentication system comprising a main mobile device comprising a near-field communication module, a non-volatile memory and a volatile memory, and being configured to communicate with a computer, a main token comprising a near-field communication module and a non-volatile memory in which at least one authentication data is recorded, the main mobile device being configured to recover, via the near-field communication module, the authentication data of the main token using a pairing key, and the main token being configured to allow access to the authentication data only upon presentation of said pairing key, wherein the pairing key is segmented into a plurality of segments, a first segment being recorded on the non-volatile memory of the main mobile device and at least one additional segment being recorded on at least one of a non-volatile memory of a secondary mobile device or a non-volatile memory of a secondary token, the main mobile device being configured to recover the at least one additional segment by near-field communication with at least one of said secondary mobile device or said secondary token, to store said at least one additional segment on its volatile memory, to reconstitute the pairing key and to present a reconstituted pairing key to the main token, the authentication method comprising:
    preparing a request for an authentication data by the application;
    transmitting the request from the computer to the main mobile device;
    communicating in near-field between the main mobile device and the main token;
    checking the reconstituted pairing key presented by the main mobile device;
    transmitting the authentication data by the main token to the main mobile device;
    storing the authentication data by the main mobile device in its volatile memory;
    transmitting the authentication data from the main mobile device to the computer; and
    authenticating the application via the authentication data.

* * * * *